United States Patent [19]

Seura

[11] Patent Number: 4,709,964
[45] Date of Patent: Dec. 1, 1987

[54] VEHICLE REAR SEAT

[75] Inventor: Yasuyuki Seura, Ayase, Japan

[73] Assignee: Ikeda Bussan Co., Ltd., Kanagawa, Japan

[21] Appl. No.: 836,479

[22] Filed: Mar. 5, 1986

[30] Foreign Application Priority Data

Mar. 22, 1985 [JP] Japan .............................. 60-39858[U]

[51] Int. Cl.⁴ .............................................. B60N 1/02
[52] U.S. Cl. .................................... 297/354; 297/219; 297/452
[58] Field of Search ............... 297/353, 354, 378, 379, 297/219, 452; 296/63, 65 R, 67

[56] References Cited

U.S. PATENT DOCUMENTS

| 2,575,548 | 11/1951 | Carter et al. | 297/219 |
| 3,226,157 | 12/1965 | Reinfeldt et al. | 297/219 |
| 4,047,756 | 9/1977 | Ney | 297/219 |
| 4,286,819 | 9/1981 | Inoue et al. | 297/379 X |
| 4,500,130 | 2/1985 | Harmand | 296/65 R |
| 4,564,239 | 1/1986 | Akimoto | 297/219 X |

Primary Examiner—Francis K. Zugel
Attorney, Agent, or Firm—Schwartz, Jeffery, Schwaab, Mack, Blumenthal & Evans

[57] ABSTRACT

A rear seat located at the rear side in the vehicle room and having a seat cushion, seat backs each arranged inclinable in relation to the seat back, and reclining devices each for inclinably connecting the seat back to the seat cushion, characterized in that a recess is formed at the lower bottom of that side of the rear seat back which corresponds to a side finisher attached to the vehicle body, that the reclining device is located in the recess, and that a piece of cover is attached to the side finisher to shield the reclining device in the recess.

6 Claims, 4 Drawing Figures

VEHICLE REAR SEAT

BACKGROUND OF THE INVENTION

1. Field of the Invention

The present invention relates to a vehicle rear seat provided with a reclining device.

2. Description of the Prior Art

There has been provided these days a vehicle rear seat provided with a reclining device to slant its back seat backward.

In the case of a vehicle rear seat shown in FIG. 1, for example, a seat back 3 is inclinably supported by a floor panel 2 which is located at the backside of a seat cushion 1, and a reclining device 5 is arranged between the seat back 3 and a side finisher 4 which is located on both sides of the seat back 3, respectively.

The reclining device 5 is located in a recess 6 formed at a lower corner of the seat back 3. The reclining device 5 is supported by the floor panel 2 while a part of it is attached to the seat back 3, to freely incline the seat back 3.

In the case of this vehicle rear seat, however, the front side of the reclining device 5 is exposed outside and fingers of a person who sits on the rear seat are caught by the reclining device because it is exposed to thereby frighten the security of the person. In addition, the exposed reclining device spoils the appearance of the rear seat. Further, dust and the like adhere to the exposed reclining device to make the latter inoperative.

SUMMARY OF THE INVENTION

The object of the present invention is to provide a vehicle rear seat, simple in structure, wherein the front side of the recess at the lower corner of the seat back is closed to make it possible to shield the reclining device, enhance the security and the appearance of the rear seat, and prevent foreign substances from entering into the recess at the lower corner of the rear seat.

A vehicle rear seat of the present invention is characterized in that a recess is formed at the lower end of that side of the rear seat which is opposite to the side finisher, that a reclining device is located in this recess, and that a piece of cover which extends to the front side of the recess to shield the reclining device is attached to the side finisher.

According to the present invention, the cover piece which extends from a part of the side finisher located on the side of the seat back can cover the front side of the recess formed at the side of the seat back and appropriately shield the reclining device in the recess. Therefore, the fear of hurting the hand or fingers of the person who sits on the rear seat by the exposed reclining device can be prevented and the security of persons in the vehicle can be thus guaranteed. In addition, the appearance of the rear seat can be enhanced because the reclining device is shield.

Further, foreign substances can be prevented from entering into the recess because the recess is covered, thereby eliminating the possibility of causing the reclining device to become inoperative. Furthermore, the cover piece does not disturb the forward-falling of the seat back because the cover piece can swing toward the side finisher side when the seat back is to be collapsed forward.

An embodiment of the present invention will be described in detail with reference to the accompanying drawings.

DETAILED DESCRIPTION OF THE PREFERRED EMBODIMENT

Figure 1:
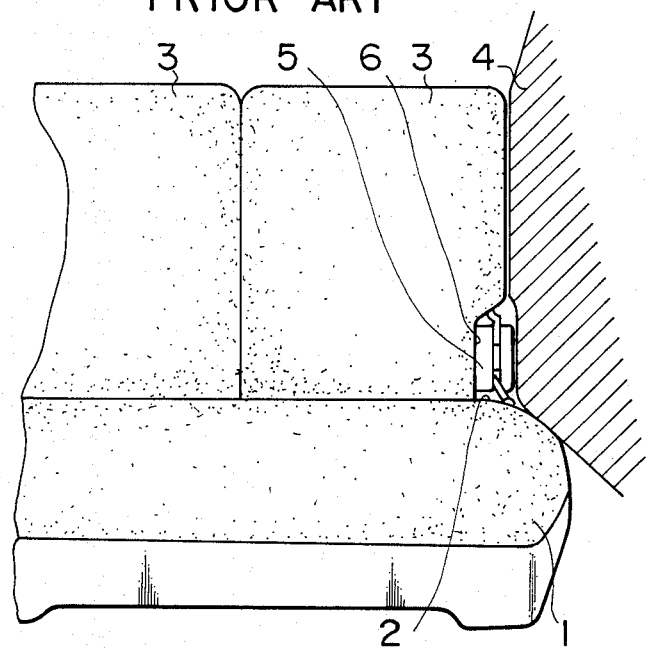
FIG. 1 is a front view briefly showing an example of the conventional vehicle rear seat.
Figure 2:
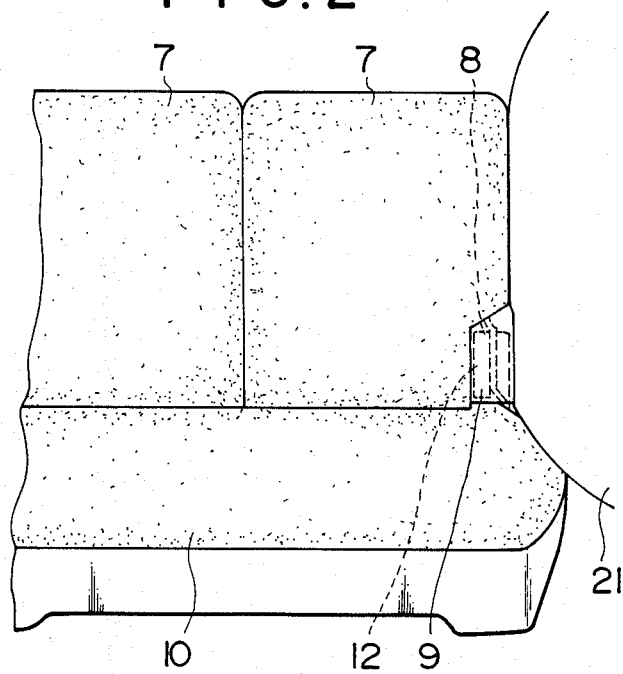
FIG. 2 is a front view briefly showing an example of the vehicle rear seat according to the present invention.

As shown in FIG. 2, the front side of a recess 8 which is formed at the lower corner of a seat back 7 is covered by a piece of cover 9 which extends from a side finisher 21 which is located on both sides of the seat backs 7 of the rear seat.

Figure 3:
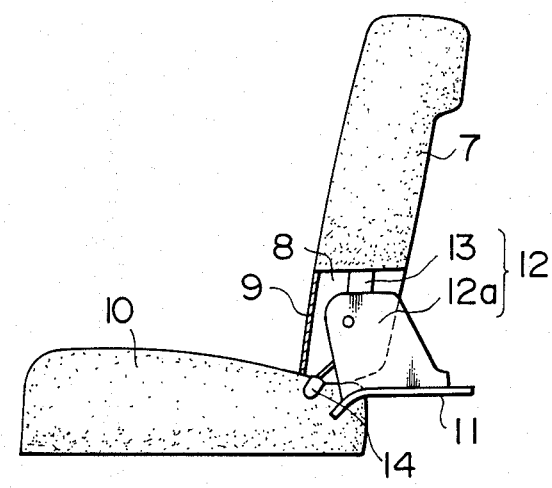
FIG. 3 is a side view showing the vehicle rear seat from which the side finisher is detached.

In the case of this vehicle rear seat according to the present invention, the seat back 7 is reclinably supported by a floor panel 11 through a hinge machanism (not shown) and it can be freely reclined and collapsed by the reclining device on the floor panel which is located at the back side of a seat cushion 10, as shown in FIG. 3.

A reclinin device 12 includes a base member 12a supported by the floor panel 11 and a reclining arm 13 engaged with the base member 12a to control the swinging of the seat back 7. The whole of the reclining device 12 is housed in the recess 8 in the seat back 7 and the reclining arm 13 is attached to the seat back 7, extending upward. When an operation knob 14 is operated, the reclining seat mechanism inside can be released from its locked condition to incline the seat back 7, and after the position at which the seat back 7 should be inclined is determined, the reclining seat mechanism is again locked to keep the seat back 7 at this inclined position.

Figure 4:
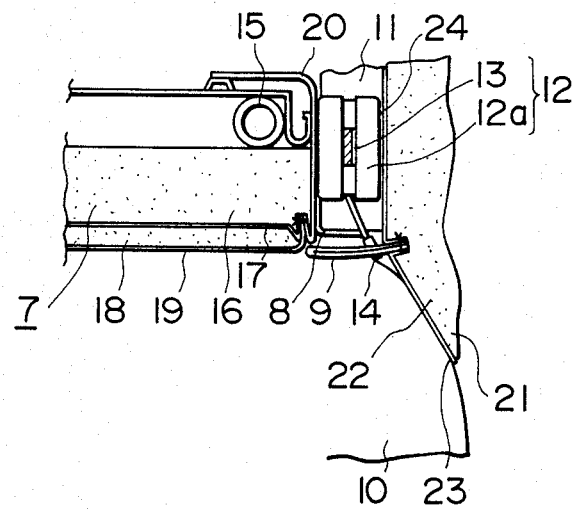
FIG. 4 is a sectional view showing the structure of the seat back and the side finisher, and the location of the reclining device in the case of the vehicle rear seat shown in FIG. 2.

As shown in FIG. 4, the seat back 7 comprises arranging pad material 16 on a frame 15 with springs (not shown) between them, covering the front side of the pad material 16 with surface material with a liner 17 and windings 18 interposed between them, and covering the side of the thus-formed seat back 7 with surface material 20. In FIG. 4, the surface material 20 which covers the side portion of the seat back 7 is contoured along adjucent to the surface material 20. The surface materials 19, 20 and the liner 17 are bent inside and sewed one another at a corner of the seat back 7. The pad material is fully removed from inside the surface material 20 which is located at the recess 8 to thereby form a space into which the reclining device 12 can be housed.

The side finisher 22 which is located on one side of the seat back 7 contains pad material 22, whose side is covered with surface materials 23 and 24.

The cover piece 9 which shields the front side of the recess 8 is sewed with the surface materials 23 and 24 and thus connected to the side finisher 21. The cover piece 9 is formed by overlapping two sheets of material, same in quarity as those of the surface materials 19, 20, 23 and 24, one upon the other. The base end portion of the cover piece 9 is sewed with those ends of surface materials 23 and 24 which are bent inside the side finisher 21. The cover piece 9 is outlined corresponding to the front side of the recess 8 and its double-overlapped structure provides a certain strength to shield the recess 8.

Although an embodiment of the present invention has been described, it should be understood that the present invention is not limited to the embodiment but that various changes and modifications can be added to the present invention. For example, the cover piece 9 may be arranged so that two sheets of material are overlapped one upon the other and that webbing belt, sheet made of vinyl chloride, or the like is interposed as a core material between the two overlapped sheets. A plane fastener or the like may be located between the foremost end of the cover piece 9 and the seat back 7 to connect the cover piece 9 to the seat back 7, thereby enabling the cover piece 9 to shield the recess 8 with certainty.

It should be further understood that various changes and modification can be added to the present invention without departing from the spirit of the present invention.

What is claimed is:

1. A rear seat located at a rear portion of a vehicle, including:
   a pair of cushions, one of said cushions being a cushioned seat back, including a recess formed a a lower bottom of a side thereof;
   the other of said cushions being a seat cushion, one of said cushions being reclinable relative to the other;
   a reclining device located in said recess;
   a side finisher attached to a side of said vehicle and including a cover piece attached thereto; and
   wherein said cover piece extends from said side finisher across a front side of said recess, said cover piece shielding said reclining device located in said recess.

2. A rear seat according to claim 1 wherein said cover piece is also attached to said cushioned seat back.

3. A rear seat according to claim 1 wherein said cover piece is also attached to said seat cushion.

4. A rear seat according to claim 1 wherein said cover piece is also attached to said cushioned seat back and to said seat cushion.

5. A rear seat according to claim 1 wherein; the seat back is reclinably attached to a floor panel.

6. A rear seat according to claim 1 wherein;
   said reclining device comprises a base member supported by a floor panel, and a reclining arm fixed to the seat back and engaged with said base member to control the reclining of said seat back.

* * * * *